April 29, 1930. E. F. RAMSEIER 1,756,305
HITCH FOR AGRICULTURAL IMPLEMENTS
Filed Sept. 3, 1929
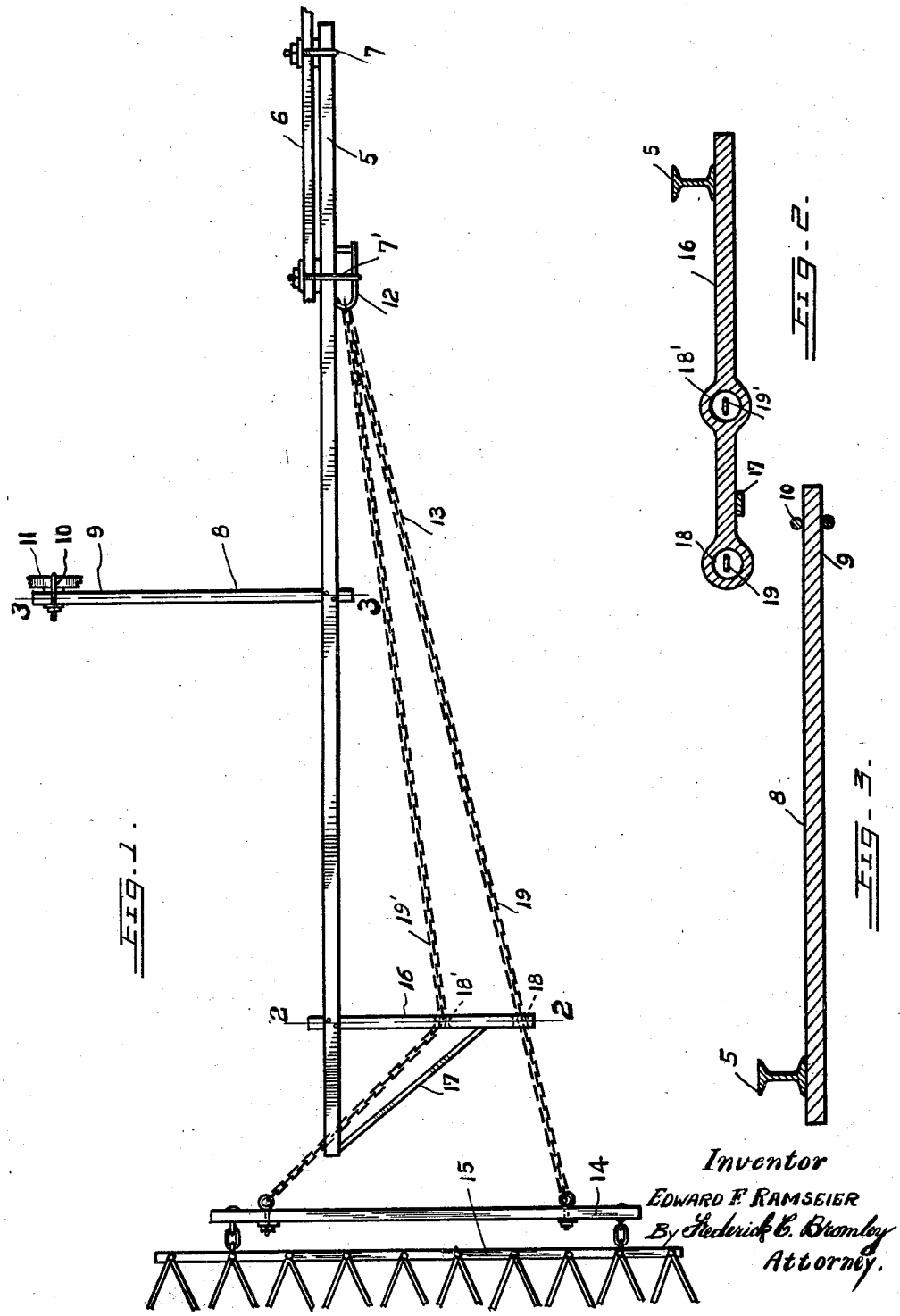
Inventor
EDWARD F. RAMSEIER
By Frederick E. Bromley
Attorney.

Patented Apr. 29, 1930

1,756,305

UNITED STATES PATENT OFFICE

EDWARD F. RAMSEIER, OF EDBERG, ALBERTA, CANADA

HITCH FOR AGRICULTURAL IMPLEMENTS

Application filed September 3, 1929. Serial No. 390,193.

The invention relates to improvements in hitches for agricultural implements as described in the present specification and shown in the accompanying drawings which form part of the same.

The invention has for its object the provision of a simple and serviceable hitch for the purpose of connecting a harrow to a gang-plow in order that the harrowing may be performed simultaneously with the plowing. Performing these operations concurrently not only saves considerable time and labor but also retains more moisture in the ground, as, when the work is done separately, the moisture is inclined to dry out between each individual operation.

The invention consists essentially of a pole which is clamped to the beams of a gang-plow in such a manner as to extend rearwardly thereof; a jib or laterally projecting member attached to the rear of the pole is apertured to receive a chain that extends from a point near the front end of the plow, the ends of the chain being connected to the draw-bar of the drag-harrow. This construction enables the harrow to be drawn over the ground and the plow turned without interfering with the harrow.

Referring to the drawings; Figure 1 is a plan view of the invention showing it connected to the beams of a gang-plow and also to the draw-bar of a harrow.

Figure 2 is a transverse view of the jib taken on the line 2—2 of Figure 1.

Figure 3 is a similar view of a cross member that forms part of the means for attaching the pole to the plow.

Like numerals of reference indicate corresponding parts in each of the figures of the drawings.

In the drawings, the reference numeral 5 denotes the pole which preferably consists of a long metal member such as an I-beam. The forward end is clamped to the front beam 6 of a gang-plow such as a two or more bottom plow. The clamping may be effected by a pair of U-bolt elements 7, 7', one of which is located at the extreme forward end of the pole and secured to the front of the beam 6 while the other is secured to the rear of said plow beam so as to connect with the pole at a point removed from the frontal extremity. The clamping members 7, 7' are of well known construction and hence do not require a detailed description.

Approximately midway of the length of the pole is a cross member 8 fixedly secured by bolts or other fastening element. The distal end 9 of this member is rigidly clamped to the beam 10 of the rear plow by means of a clamping member 11. By this construction it will be observed that the pole is securely attached to the gang-plow.

12 is a hook located towards the forward end of the pole and secured to it in any suitable manner such as by means of the clamp 7'. A chain 13 is hooked onto the hook 12 with its ends extended rearwardly of the pole and connected to the draw-bar 14 of the harrow 15, which harrow is of the well known drag type, the forward portion only of which is illustrated in Figure 1. 16 is the jib or cross member that receives the chain 13. This member is located on the opposite side to that of the member 8 and is rigidly secured to the rear of the pole in similar manner, a brace 17 preferably being provided to assist in taking lateral thrust.

A pair of openings 18, 18' is provided in the jib 16 spaced apart as clearly illustrated in Figure 2. The opening 18 receives the chain length 19, while the opening 18' receives the chain length 19', thus retaining them in spaced relation.

This construction provides an efficient and serviceable hitch which in practice has been found not to interfere with the guiding of the implements.

What I claim is:—

1. A hitch of the class described, comprising a pole for attachment to a plow, a flexible element connected to the forward end thereof and extended substantially length wise of the pole to beyond its rear end for attachment to the draw-bar of a drag harrow, and a jib rigidly projecting from the pole and having openings through which the flexible element is passed.

2. A hitch of the class described, comprising a pole, a cross member laterally extending from one side thereof, clamping members for securing said cross member and also the forward portion of the pole to beams of a gang plow, a flexible element connected to said forward portion of the pole and extended substantially lengthwise thereof to beyond the rear end for attachment to the draw-bar of a drag-harrow, and a jib rigidly projecting from the pole and having openings through which the flexible element is passed.

3. A hitch of the class described, comprising a pole for attachment to a plow, a hook affixed thereto in the vicinity of its frontal end, a flexible element hooked onto the hook and extended lengthwise of the pole to beyond its rear end for attachment to the draw-bar of a drag harrow, and a jib rigidly projecting from the pole and having openings through which the flexible element is passed.

4. A hitch of the class described, comprising a pole for attachment to a plow, a double flexible element having its bight hooked to the forward portion of the pole and extended substantially lengthwise thereof to beyond its rear end so that the termini of the flexible element may be separately attached to the ordinary connecting elements of a drag harrow draw-bar, and a jib projecting outwardly from one side of the pole near the rear thereof and provided with two openings located in spaced relation, one length of the flexible element being passed through one of said openings while the other length of said flexible element is passed through the other opening.

Signed at Camrose, Alberta, Canada, the 6th day of August 1929.

EDWARD F. RAMSEIER.